(12) United States Patent
Kawakita

(10) Patent No.: US 12,291,234 B2
(45) Date of Patent: May 6, 2025

(54) PATH PLANNING DEVICE, PATH PLANNING METHOD, COMPUTER PROGRAM PRODUCT

(71) Applicant: DENSO CORPORATION, Kariya (JP)

(72) Inventor: Kouji Kawakita, Kariya (JP)

(73) Assignee: DENSO CORPORATION, Kariya (JP)

( * ) Notice: Subject to any disclaimer, the term of this patent is extended or adjusted under 35 U.S.C. 154(b) by 106 days.

(21) Appl. No.: 17/816,629

(22) Filed: Aug. 1, 2022

(65) Prior Publication Data
US 2022/0371620 A1 Nov. 24, 2022

Related U.S. Application Data

(63) Continuation of application No. PCT/JP2020/046063, filed on Dec. 10, 2020.

(30) Foreign Application Priority Data

Feb. 3, 2020 (JP) .................................. 2020-016457

(51) Int. Cl.
*B60W 60/00* (2020.01)
*B60W 40/04* (2006.01)
*B60W 50/00* (2006.01)

(52) U.S. Cl.
CPC ........ *B60W 60/0011* (2020.02); *B60W 40/04* (2013.01); *B60W 50/0097* (2013.01); *B60W 60/0015* (2020.02); *B60W 2554/406* (2020.02)

(58) Field of Classification Search
CPC ............. B60W 60/0011; B60W 40/04; B60W 50/0097; B60W 60/0015; B60W 2554/406; B60W 2552/53; B60W 2555/60; B60W 30/10
See application file for complete search history.

(56) References Cited

U.S. PATENT DOCUMENTS

| | | | |
|---|---|---|---|
| 2017/0308094 A1* | 10/2017 | Abe | B60W 30/143 |
| 2018/0267548 A1 | 9/2018 | Sumioka | |
| 2018/0365533 A1* | 12/2018 | Sathyanarayana | G06F 18/24 |
| 2021/0261123 A1* | 8/2021 | Wray | B60W 60/001 |
| 2022/0319327 A1* | 10/2022 | Nakamura | G08G 1/166 |

FOREIGN PATENT DOCUMENTS

| | | |
|---|---|---|
| JP | 2016-017914 A | 2/2016 |
| JP | 2017-132332 A | 8/2017 |
| JP | 2018-165674 A | 10/2018 |
| JP | 2019-086379 A | 6/2019 |

* cited by examiner

*Primary Examiner* — Behrang Badii
(74) *Attorney, Agent, or Firm* — Maschoff Brennan

(57) ABSTRACT

A path planning device configured to plan a traveling path on a future route of a vehicle includes a lane evaluation unit, a score accumulation unit, and a lane selection unit. The lane evaluation unit is configured to estimate a risk score of each chronological section of each traveling lane parallel traveling lanes, the risk score representing a traveling risk. The score accumulation unit is configured to accumulate the risk scores for each traveling lane. The lane selection unit is configured to select the traveling lane for the traveling path based on evaluation accumulated values. The lane evaluation unit is configured to estimate a base score based on static information. The static information contains a traveling difficulty for the vehicle at a change node. The lane evaluation unit is configured to estimate the base score such that the traveling risk is higher as the traveling difficulty is higher.

12 Claims, 14 Drawing Sheets

PATH PLANNING DEVICE, PATH PLANNING METHOD, COMPUTER PROGRAM PRODUCT

CROSS REFERENCE TO RELATED APPLICATION

The present application is a continuation application of International Patent Application No. PCT/JP2020/046063 filed on Dec. 10, 2020, which designated the U.S. and claims the benefit of priority from Japanese Patent Application No. 2020-016457 filed on Feb. 3, 2020. The entire disclosures of all of the above applications are incorporated herein by reference.

TECHNICAL FIELD

The present disclosure relates to a path planning technique for planning a traveling path in a future route of a vehicle.

BACKGROUND

A technique for planning, in a future route with multiple parallel traveling lanes, a traveling path to which a vehicle will follow is known. In this technique, the traveling efficiency is compared between a case where the current traveling lane is continuously selected and a case where another traveling lane is selected. As a result, the traveling schedule is updated by selecting the traveling lane with higher traveling efficiency.

SUMMARY

A first aspect of the present disclosure is a path planning device configured to plan a traveling path on a future route of a vehicle. The path planning device includes: a lane evaluation unit configured to estimate a risk score of each chronological section of each traveling lane on the future route including parallel traveling lanes, the risk score representing a traveling risk; a score accumulation unit configured to accumulate the risk scores of chronological sections for each traveling lane; and a lane selection unit configured to select the traveling lane for the traveling path based on evaluation accumulated values each of which is calculated by accumulating the risk scores for each traveling lane. The lane evaluation unit is configured to estimate, as the risk score of a first one of the chronological sections in each traveling lane, a base score based on static information that is fixed in time. The static information contains a traveling difficulty for the vehicle at a change node at which a lane arrangement changes on the future route. The lane evaluation unit is configured to estimate the base score such that the traveling risk is higher as the traveling difficulty is higher.

A second aspect of the present disclosure is a path planning device configured to plan a traveling path on a future route of a vehicle. The path planning device includes: a lane evaluation unit configured to estimate a risk score of each chronological section of each traveling lane on the future route including parallel traveling lanes, the risk score representing a traveling risk; a score accumulation unit configured to accumulate the risk scores of chronological sections for each traveling lane; and a lane selection unit configured to select the traveling lane for the traveling path based on evaluation accumulated values each of which is calculated by accumulating the risk scores for each traveling lane. The lane evaluation unit is configured to estimate the risk score of each of the chronological sections based on static information that is fixed in time. The static information contains a lane width of each traveling lane. The lane evaluation unit is configured to estimate the risk score such that the traveling risk is higher as the lane width is narrower.

A third aspect of the present disclosure is a method for a processor to plan a traveling path on a future route of a vehicle. The method includes: estimating a risk score of each chronological section of each traveling lane on the future route including parallel traveling lanes, the risk score representing a traveling risk; accumulating the risk scores of chronological sections for each traveling lane; and selecting the traveling lane for the traveling path based on evaluation accumulated values each of which is calculated by accumulating the risk scores for each traveling lane. In the estimating the risk score, a base score is estimated based on static information that is fixed in time as the risk score of a first one of the chronological sections in each traveling lane. The static information contains a traveling difficulty for the vehicle at a change node at which a lane arrangement changes on the future route. In the estimating the risk score, the risk score is estimated such that the traveling risk is higher as the traveling difficulty is higher.

A fourth aspect of the present application is a method for a processor to plan a traveling path on a future route of a vehicle. The method includes: estimating a risk score of each chronological section of each traveling lane on the future route including parallel traveling lanes, the risk score representing a traveling risk; accumulating the risk scores of chronological sections for each traveling lane; and selecting the traveling lane for the traveling path based on evaluation accumulated values each of which is calculated by accumulating the risk scores for each traveling lane. In the estimating the risk score, the risk score of each of the chronological sections is estimated based on static information that is fixed in time. The static information contains a lane width of each traveling lane. In the estimating the risk score, the risk score is estimated such that the traveling risk is higher as the lane width is narrower.

A fifth aspect of the present application is a computer program product for planning a traveling path on a future route of a vehicle. The computer program product is stored on at least one non-transitory computer readable medium and includes instructions configured to, when executed by at least one processor, cause the at least one processor to: estimate a risk score of each chronological section of each traveling lane on the future route including parallel traveling lanes, the risk score representing a traveling risk; accumulate the risk scores of chronological sections for each traveling lane; select the traveling lane for the traveling path based on evaluation accumulated values each of which is calculated by accumulating the risk scores for each traveling lane; and estimate, as the risk score of a first one of the chronological sections in each traveling lane, a base score based on static information that is fixed in time. The static information contains a number of lane changes required for arriving at the traveling lane which is optimal at a planning end position on the future route from a planning start position of each traveling lane, and The risk score is estimated such that the traveling risk is higher as the traveling difficulty is higher.

A sixth aspect of the present disclosure is a computer program product for planning a traveling path on a future route of a vehicle. The computer program product is stored on at least one non-transitory computer readable medium and includes instructions configured to, when executed by at least one processor, cause the at least one processor to:

estimate a risk score of each chronological section of each traveling lane on the future route including parallel traveling lanes, the risk score representing a traveling risk; accumulate the risk scores of chronological sections for each traveling lane; select the traveling lane for the traveling path based on evaluation accumulated values each of which is calculated by accumulating the risk scores for each traveling lane; and estimate, as the risk score of a first one of the chronological sections in each traveling lane, a base score based on static information that is fixed in time. The risk score of each of the chronological sections is estimated based on static information that is fixed in time. The static information contains a lane width of each traveling lane. The risk score is estimated such that the traveling risk is higher as the lane width is narrower.

EMBODIMENTS

A traveling risk due to various factors in each traveling lane may change depending on a place or time even in the same lane. Accordingly, if the traveling lane is selected based on a single factor which is the traveling efficiency, the traveling lane may be erroneously selected, and the traveling path may be erroneously planned.

Hereinafter, one embodiment will be described based on the drawings.

Figure 1:
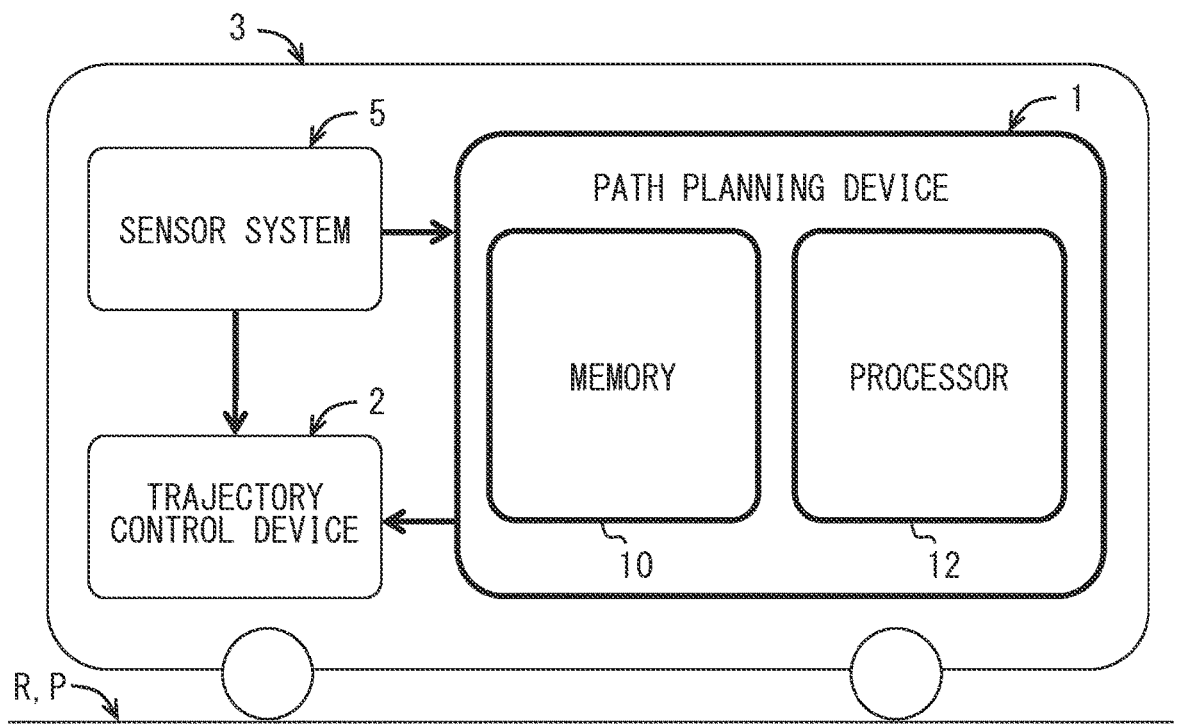
FIG. 1 is a block diagram showing an overall configuration of a path planning device according to an embodiment.

A path planning device 1 according to the embodiment shown in FIG. 1 is configured to plan a traveling path P in a future route R of a vehicle 3 from the current position. The path planning device 1 is mounted on the vehicle 3 together with a trajectory control device 2. The trajectory control device 2 is configured to perform a trajectory control of the vehicle 3 in the traveling path P generated by the path planning device 1. The vehicle 3 is, for example, an automatic driving vehicle or an advanced driving assistance vehicle that can autonomously travel constantly or temporarily by receiving the trajectory control of the trajectory control device 2. In the vehicle 3, the future route R is updated as needed during automatic driving by an integrated ECU (Electronic Control Unit) configured to integrate the advanced driving assistance or the automated driving control. In the following description, the vehicle 3 on which the path planning device 1 and the trajectory control device 2 are mounted is referred to as a subject vehicle 3.

Figure 2:
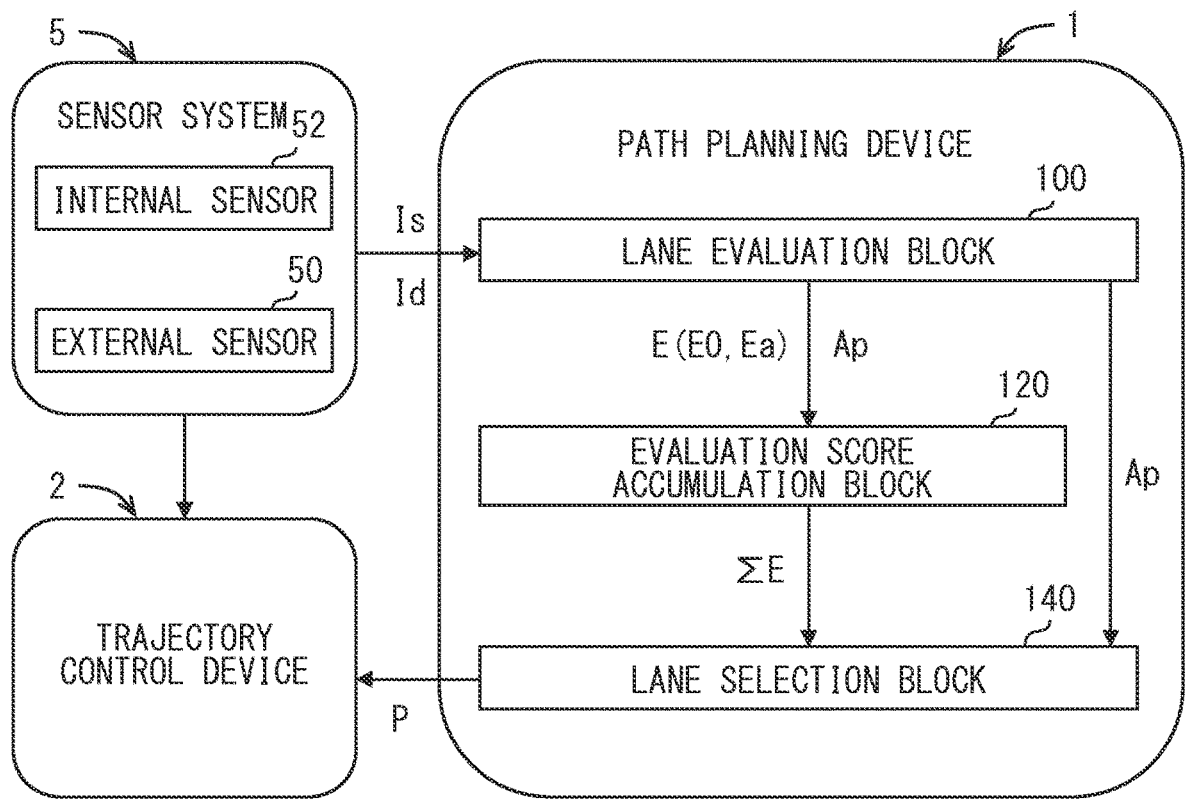
FIG. 2 is a block diagram showing a detail configuration of the path planning device according to an embodiment.

A sensor system 5 is mounted on the subject vehicle 3 in addition to the path planning device 1 and the trajectory control device 2. The sensor system 5 acquires various kinds of information that can be utilized for the path planning by the path planning device 1 and for the trajectory control by the trajectory control device 2. As shown in FIG. 2, the sensor system 5 includes an external sensor 50 and an internal sensor 52.

The external sensor 50 generates information about the outside of the subject vehicle 3, which is the surrounding environment of the subject vehicle 3. The external sensor 50 may acquire the external information by detecting an object existing in the outside of the subject vehicle 3. The external sensor 50 of the detection type includes one or some of a camera, a LiDAR (Light Detection and Ranging/Laser Imaging Detection and Ranging), a radar, a sonar, and the like, for example. The external sensor 50 may acquire the external information by receiving a signal from an artificial satellite of a GNSS (Global Navigation Satellite System) disposed in the outside of the subject vehicle 3 or a signal from a roadside device of ITS (Intelligent Transport Systems). The external sensor 50 of the reception type is at least one of, for example, a GNSS receiver, a telematics receiver, and the like.

The internal sensor 52 generates information about the inside of the subject vehicle 3, which is the internal environment of the subject vehicle 3. The internal sensor 52 may generate the internal information by detecting a specific motion physical quantity in the inside of the subject vehicle 3. The detection type inside sensor 52 is, for example, at least one of a gyroscope, a traveling speed sensor, an acceleration sensor, a steering angle sensor, and the like.

Figure 3:
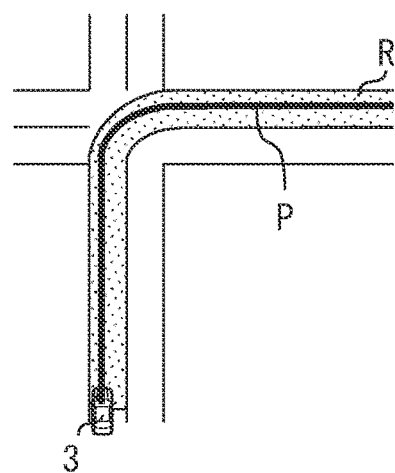
FIG. 3 is a schematic diagram for explaining a traveling path planned by the path planning device according to the embodiment.
Figure 4:
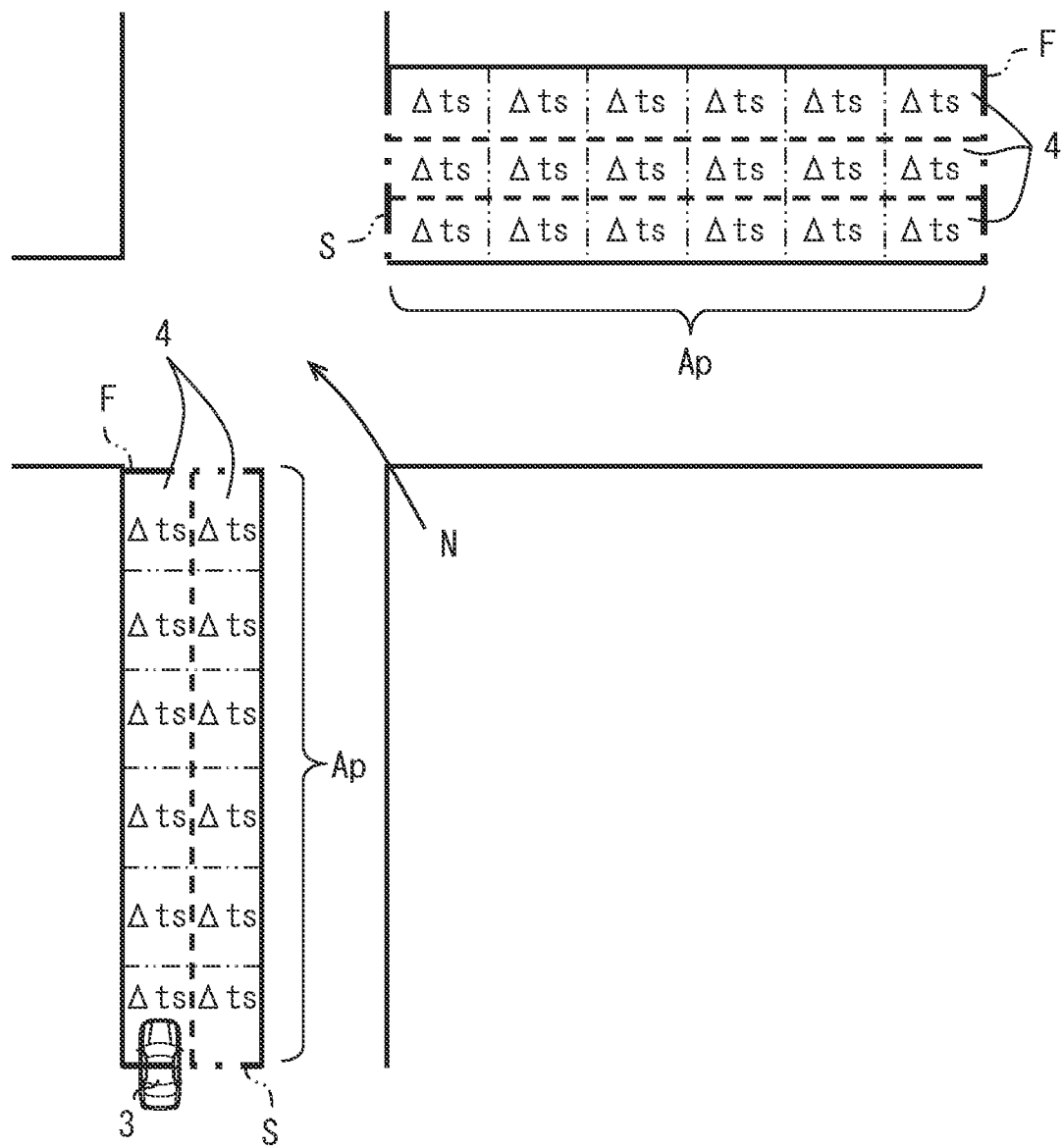
FIG. 4 is a schematic diagram for explaining a setting process for a path planning area and an evaluation process for the traveling lane according to the embodiment.
Figure 5:
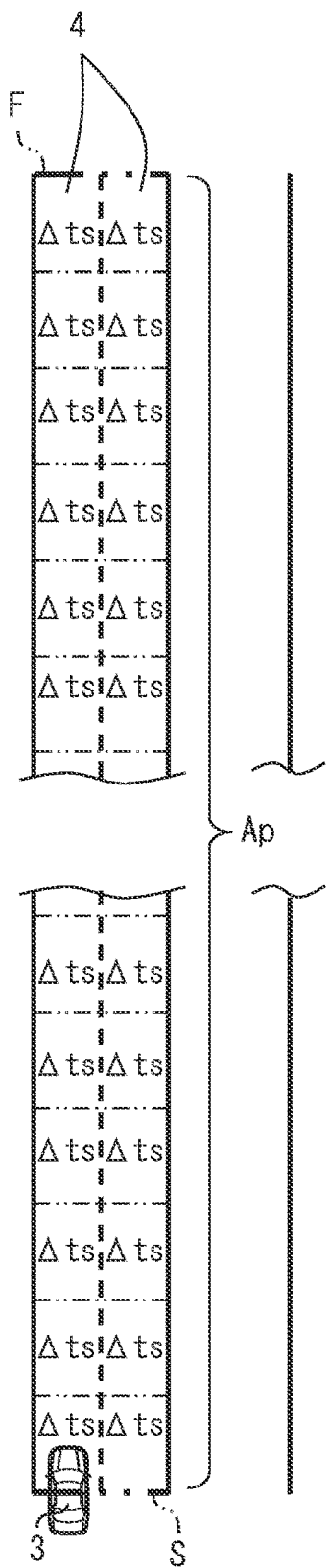
FIG. 5 is a schematic diagram for explaining the setting process for the path planning area and the evaluation process for the traveling lane according to the embodiment.

Based on the acquired information acquired by the sensor system 5, the traveling path P generated by the path planning device 1 and output to the trajectory control device 2 defines, on the future route R and in chronological order, a path along which the vehicle travels as shown in FIG. 3. The path planning device 1 is configured to plan the traveling path P in a path planning area Ap of the future route R from a planning start position S to a planning end position F as shown in FIGS. 4, 5.

In a scene where there are multiple parallel traveling lanes 4 in the same direction in the future route R, the path planning device 1 selects a traveling lane 4p (see FIG. 13) for the traveling path P. The path planning device 1 is configured to individually select the traveling lanes 4p for the traveling path P before the change node N and after the change node N as shown in FIG. 4. The change node N is a location at which the lane arrangement of the traveling lanes 4 on the future route R in the same direction changes. The change node N is at least one of an intersection where the direction of the parallel traveling lanes changes in a curved shape with a right turn of the subject vehicle 3, a link point where the number of the traveling lanes 4 change, and the like. The parallel traveling lanes 4 in the same direction are simply referred to as the traveling lanes 4 in the following description.

The path planning device 1 shown in FIG. 1 includes at least one dedicated computer. The dedicated computer included in the path planning device 1 may be an ECU configured to integrate an advanced driving assistance or an automated driving control of the subject vehicle 3. The dedicated computer of the path planning device 1 may be an ECU of the locator used for the advanced driver assistance or the automated driving of the subject vehicle 3. The dedicated computer of the path planning device 1 may be an ECU of the navigation device configured to navigate the driving of the subject vehicle 3. The dedicated computer included in the path planning device 1 may be a communication ECU configured to control a communication between the subject vehicle 4 and an external device. These ECUs are connected to the trajectory control device 2 and the sensor system 5 via at least one of a LAN (Local Area Network), a wire harness, an internal bus, and the like. The dedicated computer of the path planning device 1 may be a trajectory ECU used as the trajectory control device 2 to control at least the trajectory generation or the trajectory following steering of the subject vehicle 3. The trajectory ECU is connected to the sensor system 5 via at least one of a LAN, a wire harness, an internal bus, and the like.

The dedicated computer of the path planning device 1 has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one of, for example, a CPU (Central Processing Unit), a GPU (Graphics Processing Unit), an RISC (Reduced Instruction Set Computer) CPU, and so on.

The processor 12 executes a plurality of instructions included in the path planning program stored in the memory 10. Thereby, the path planning device 1 establishes a plurality of functional blocks for planning the traveling path P. That is, in the path planning device 1, the path planning program stored in the memory 10 causes the processor 12 to execute a plurality of instructions in order to plan the traveling path P, and thus a plurality of functional blocks are built. The functional blocks build by the path planning device 1 include, as shown in FIG. 3, a lane evaluation block 100, an evaluation score accumulation block 120, and a lane selection block 140.

In a scene where there is the change node N on the future route R as shown in FIG. 4, the lane evaluation block 100 sets path planning areas Ap by assigning the planning start position S to the current position of the subject vehicle 3 and the end position of the change node N. The assignment process is performed based on the external information acquired by the external sensor 50 and the internal information acquired by the internal sensor 52. The planning end position F of the path planning area Ap whose planning start position S is the current position is the start position of the change node N. The planning end position F of the path planning area Ap whose planning start position S is the end position of the change node N is, for example, the link position through which the vehicle 3 passes, a destination of the subject vehicle 3, or the start position of next change node N.

In a scene where there is no change node N on the future route R as shown in FIG. 5, the lane evaluation block 100 sets single path planning area Ap by assigning single planning start position S to the current position of the subject vehicle 3. This assignment process is also performed based on the external information acquired by the external sensor 50 and the internal information acquired by the internal sensor 52. The planning end position F of the path planning area Ap here is, for example, the link position through which the subject vehicle 3 passes, or the destination of the subject vehicle 3.

For the at least one path planning area Ap set in this way, the lane evaluation block 100 evaluates each of the parallel traveling lanes 4 shown in FIGS. 4, 5. The evaluation process is performed based on the information from the sensor system 5.

Figure 6:
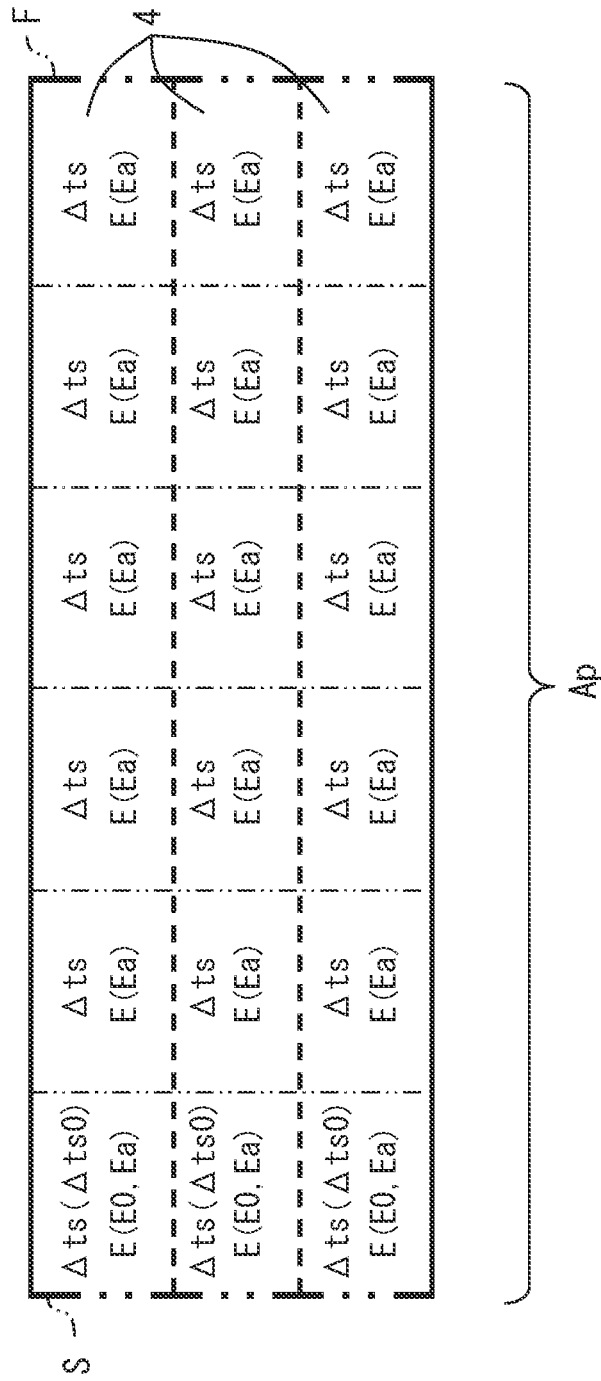
FIG. 6 is a schematic diagram for explaining the evaluation process for the traveling lane according to the embodiment.

The lane evaluation block 100 shown in FIG. 2 is configured to estimate a risk score E which represents a traveling risk of the traveling lane 4. The lane evaluation block 100 divides each lane 4 in the path planning area Ap on the future route R into chronological sections $\Delta ts$ as shown in FIGS. 4, 5. Each traveling lane 4 is divided into the same number of the chronological sections $\Delta ts$. Each chronological section $\Delta ts$ has the same time length or the same distance. The lane evaluation block 100 calculates the risk score E of each chronological section $\Delta ts$ for each traveling lane 4 as shown in FIG. 6. In the present embodiment, smaller value of the risk score E represents lower traveling risk.

For evaluating the traveling lane 4, the lane evaluation block 100 estimates a base score E0 for each traveling lane 4 as the risk score E for the first chronological section $\Delta ts0$ of the chronological sections $\Delta ts$ on the future route R. The first chronological section $\Delta ts0$ is a section whose start end is the planning start position S of the path planning area Ap. The lane evaluation block 100 is configured to calculate the base score E0 for each traveling lane 4 of the first chronological sections $\Delta ts0$ based on static information Is acquired from the sensor system 5 shown in FIG. 2. The static information Is is fixed information, i.e. information that does not change for a long time longer than a set time period.

Figure 7:
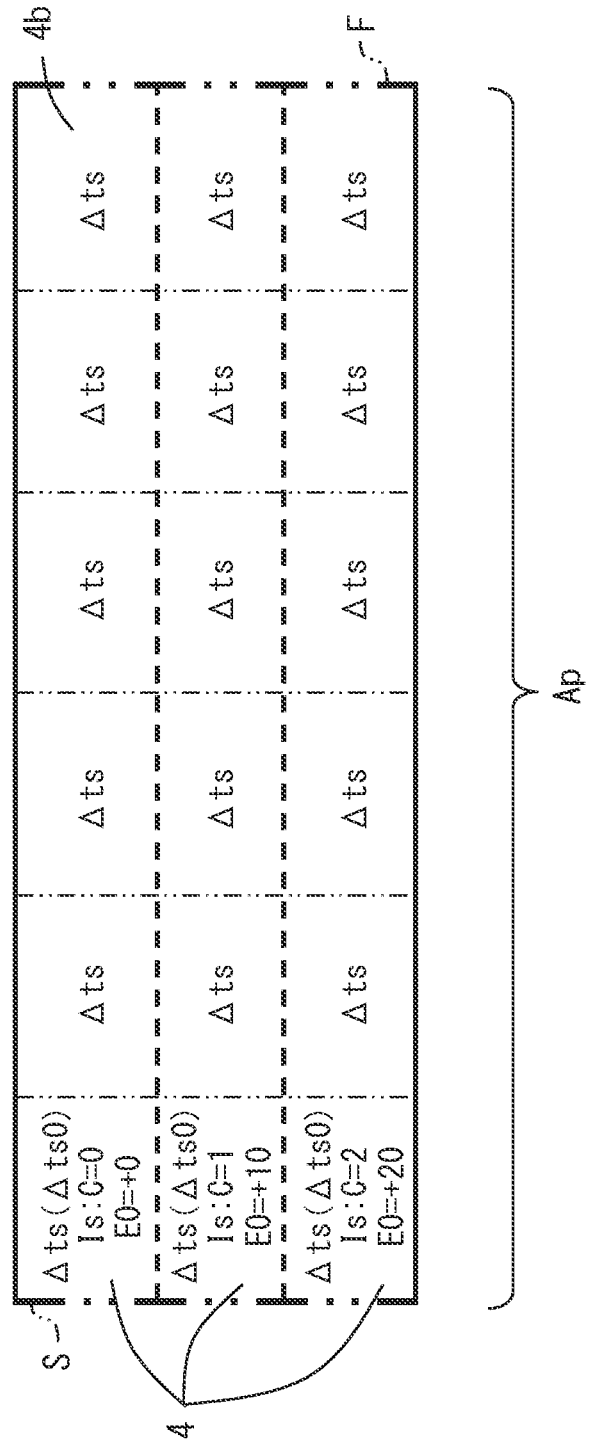
FIG. 7 is a schematic diagram for explaining the evaluation process for the traveling lane according to the embodiment.

The static information Is used for calculating the base score E0 contains at least the number of lane change C as shown in FIG. 7 regardless of whether the planning start position S is the current position of the subject vehicle 3 or the position of the change node N. The number of lane change C is the number of times that the subject vehicle 3 crosses the lane marking until the subject vehicle 3 arrives at the optimal traveling lane at by the planning end position F from the traveling lane 4 indicated at the planning start position S. The optimal traveling lane 4b is set to the traveling lane 4 where it is expected that the subject vehicle 3 arrives at the planning end position F. The lane evaluation block 100 is configured to estimate a value that is added as the base score E0 for the first chronological sections $\Delta ts0$ such that the traveling risk is higher as the traveling lane 4 has a larger number of lane change C.

Figure 8:
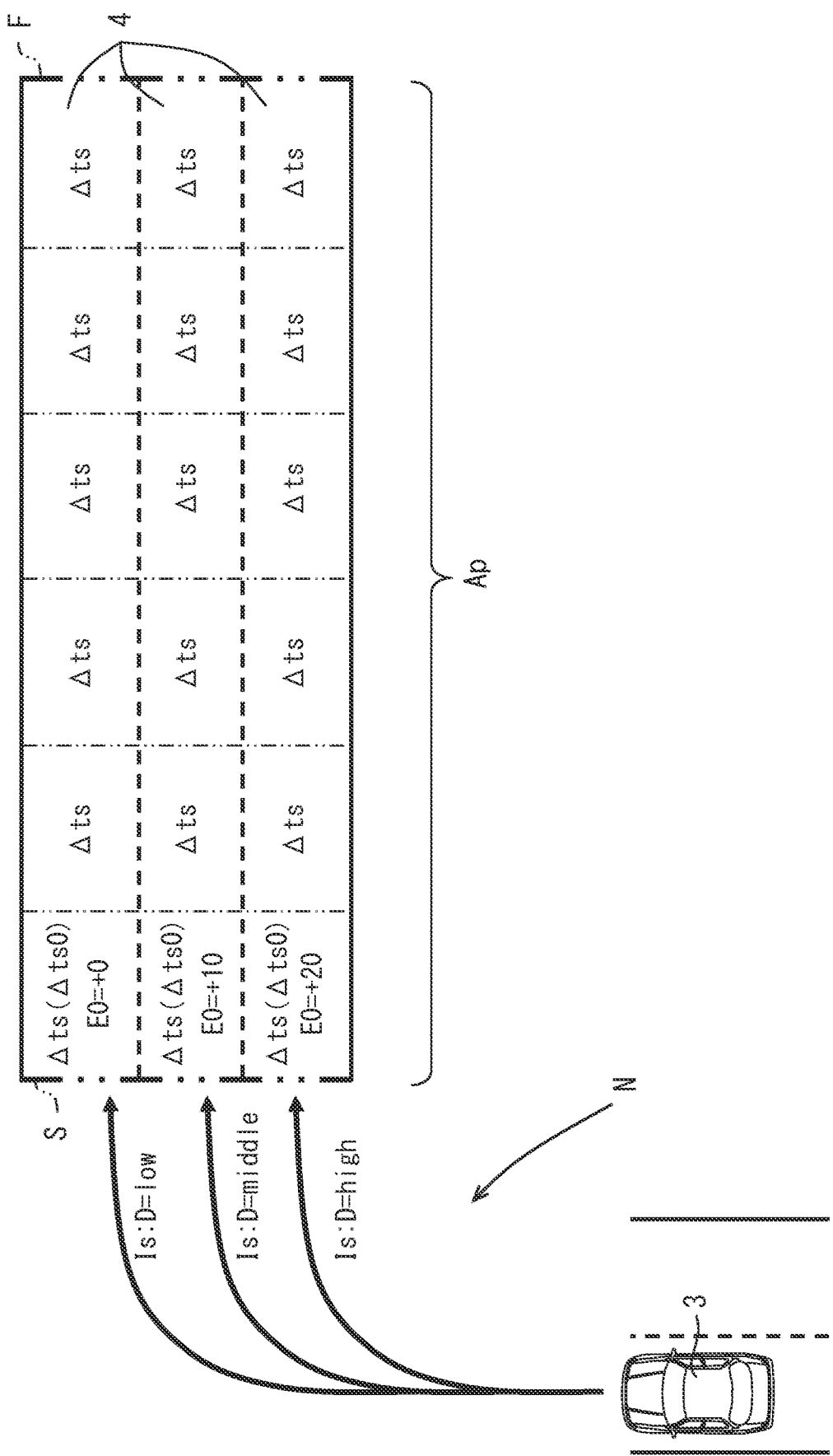
FIG. 8 is a schematic diagram for explaining the evaluation process for the traveling lane according to the embodiment.

When the planning start position S of the path planning area Ap is set at the position of the change node N, the static information Is used for calculating the base score E0 contains at least the traveling difficulty level D as shown in FIG. 8. The traveling difficulty level D represents a driving difficulty for the subject vehicle 3 passing through the change node N due to the change of the lane arrangement of the traveling lanes 4. The lane evaluation block 100 is configured to estimate the value added as the base score E0 for the first chronological sections Δts0 such that the traveling risk is higher as the traveling lane 4 has a higher traveling difficulty level D.

For evaluating the traveling lane 4, the lane evaluation block 100 estimates, as the risk score E which is added to the base score E0 of each traveling lane 4 as shown in FIG. 6, the additional score Ea for each chronological sections Δts including the first chronological sections Δts0. The lane evaluation block 100 is configured to calculate the additional score Ea of each chronological sections Δts for each traveling lane 4 based on the static information Is and dynamic information Id (see FIG. 3) acquired from the sensor system 5 shown in FIG. 2. The static information Is is fixed information, i.e. information that does not change for a long time longer than a set time period. In contrast, the dynamic information Id is time-varying information, i.e. information that changes within the set time period.

Figure 9:
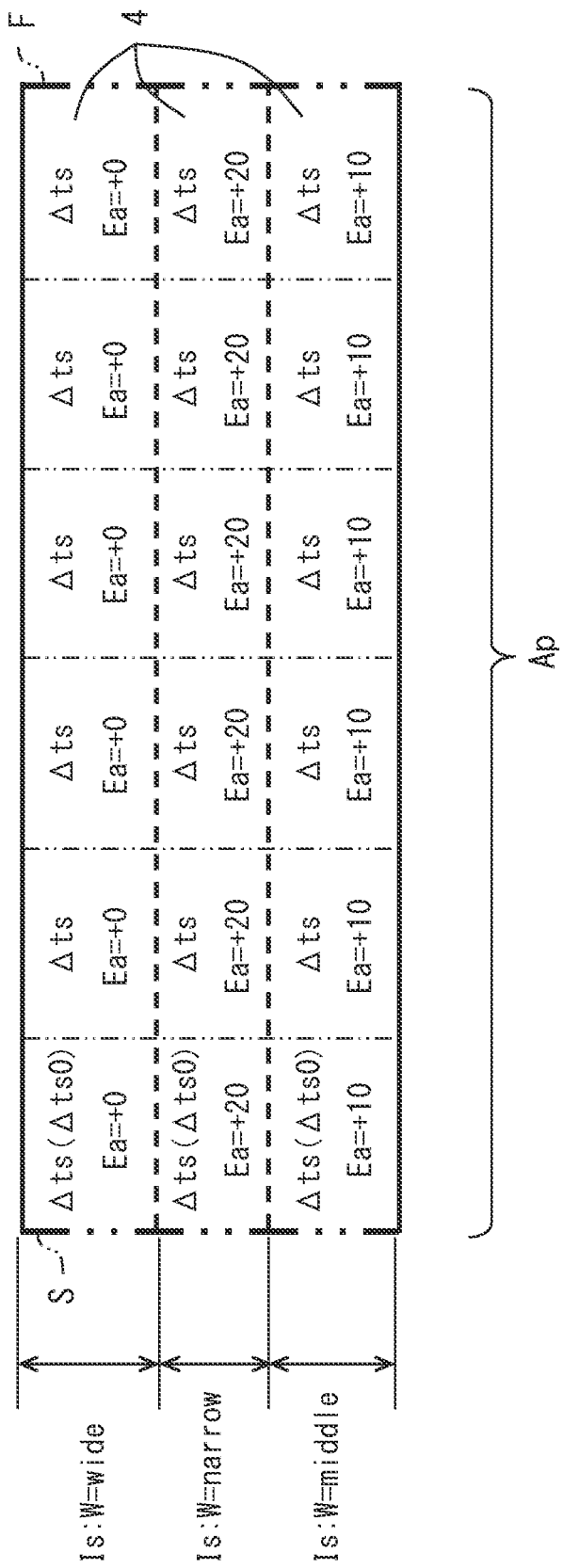
FIG. 9 is a schematic diagram for explaining the evaluation process for the traveling lane according to the embodiment.

The static information Is used for calculating the additional score Ea contains at least the lane width W shown in FIG. 9 regardless of whether the planning start position S is the current position of the subject vehicle 3 or the position of the change node N. The lane width W is a width of the chronological section Δts of each traveling lane 4 in the lateral direction. The lane evaluation block 100 is configured to estimate the value of the additional score Ea such that the value is higher as the lane width W of the chronological sections Δts of the traveling lane 4 is narrower. In FIG. 9, the chronological sections Δts in the same traveling lane 4 have substantially the same traveling lane W. However, the lane width W of the traveling lane 4 may be different in each chronological section Δts.

Figure 10:
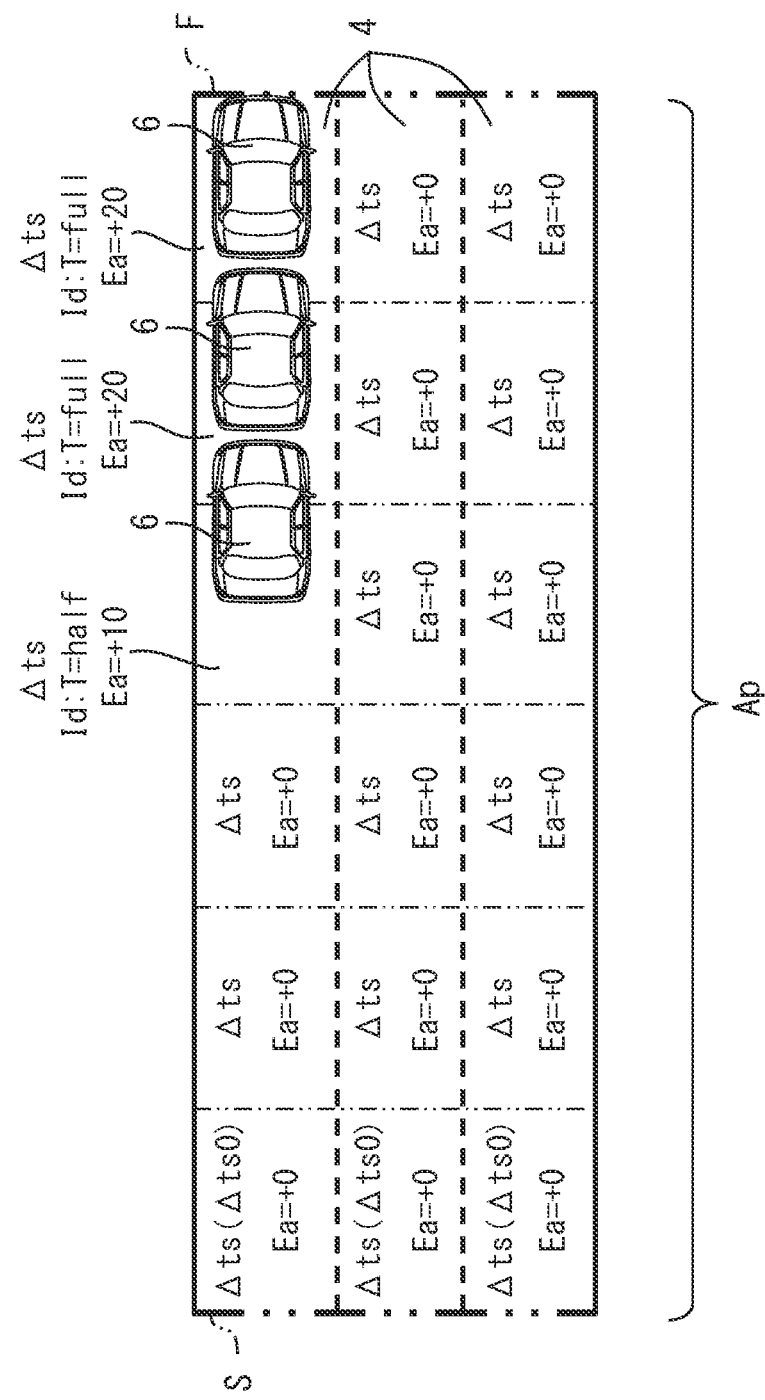
FIG. 10 is a schematic diagram for explaining the evaluation process for the traveling lane according to the embodiment.

The dynamic information Id used for calculating the additional score Ea contains at least the traffic congestion information T shown in FIG. 10 regardless of whether the planning start position S is the current position of the subject vehicle 3 or the position of the change node N. The traffic congestion information T represents a traffic congestion situation of the other vehicles 6 of each chronological section Δts for each traveling lane 4. The lane evaluation block 100 is configured to estimate the value of the additional score Ea such that the value is higher as the traffic congestion distance in the chronological sections Δts of the traveling lane 4 is longer.

Figure 11:
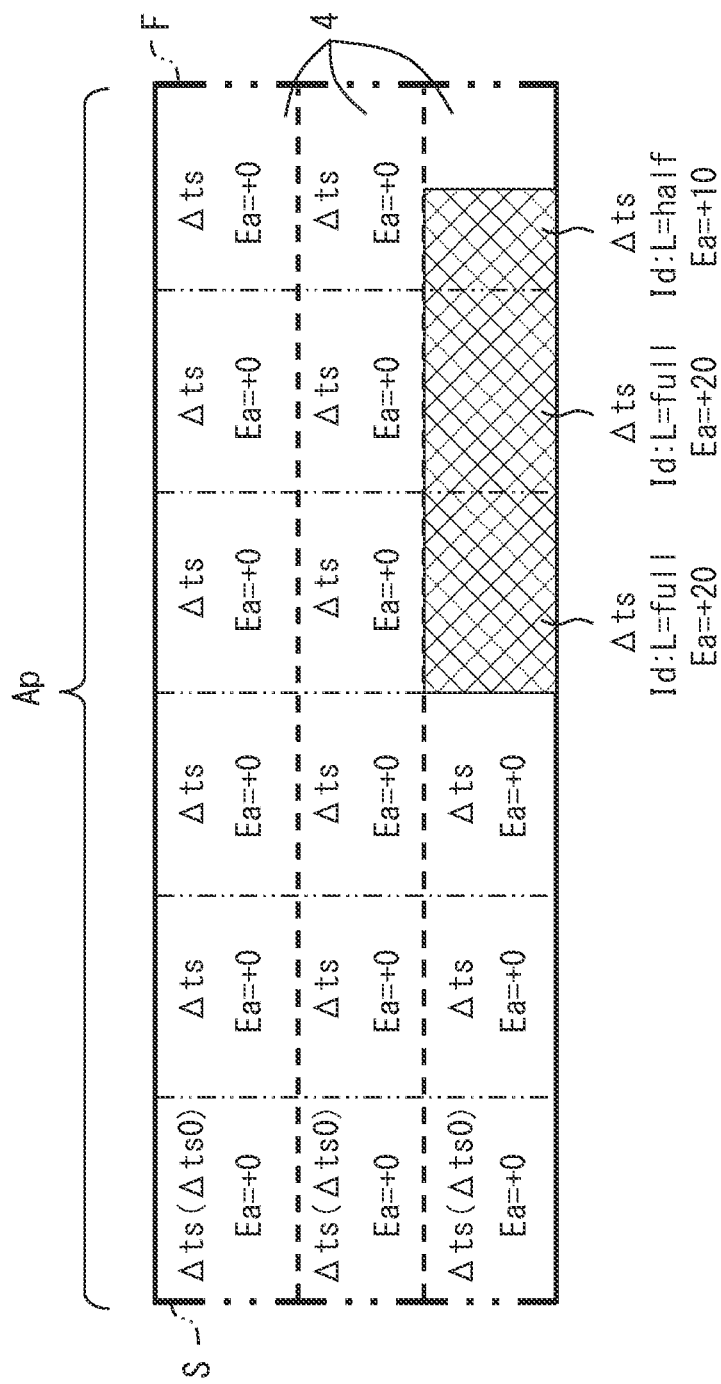
FIG. 11 is a schematic diagram for explaining the evaluation process for the traveling lane according to the embodiment.

The dynamic information Id used for calculating the additional score Ea contains at least the regulation information L shown in FIG. 11 regardless of whether the planning start position S is the current position of the subject vehicle 3 or the position of the change node N. The regulation information L represents an occurrence situation, in each chronological section Δts of each traveling lane 4, the of at least one of a traffic regulation, construction and obstruction, for example, as a situation where the traveling of the subject vehicle 3 is limited. The lane evaluation block 100 is configured to estimate the value of the additional score Ea such that the traveling score is higher as the distance of the area where the traveling is regulated in the chronological sections Δts of the traveling lane 4 is longer.

Figure 12:
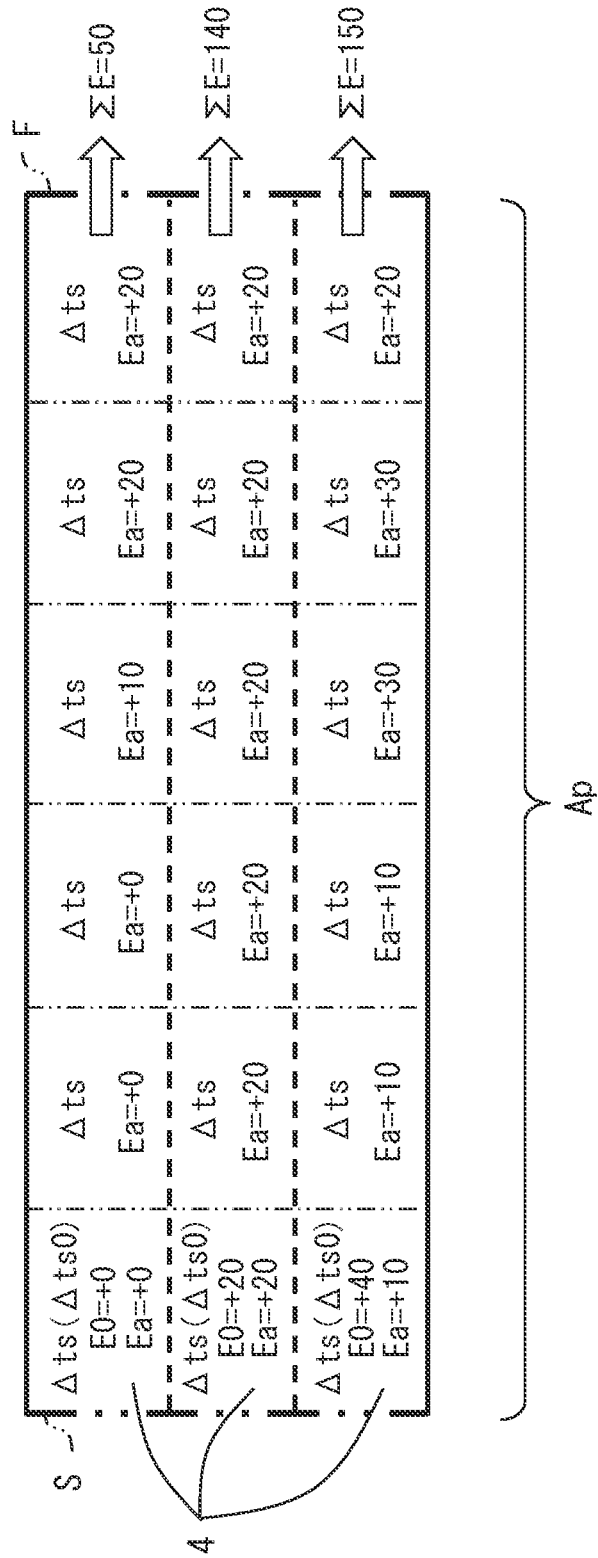
FIG. 12 is a schematic diagram for explaining a accumulation process for a risk score according to the embodiment.

The evaluation score accumulation block 120 shown in FIG. 2 is configured to add up, for each traveling lane 4, the risk scores estimated by the lane evaluation block 100 for each chronological section Δts in the path planning area Ap with the parallel traveling lanes 4. The additional score Ea calculated by the lane evaluation block 100 for each chronological section Δts is added to the base score E0 calculated by the lane evaluation block 100 as shown in FIG. 12 for each traveling lane 4. The evaluation score accumulation block 120 acquires, as the evaluation accumulated value ΣE, the accumulated value which is calculated by accumulating the risk score E for each traveling lane 4. The accumulation means to calculate the sum of the risk score E.

Figure 13:
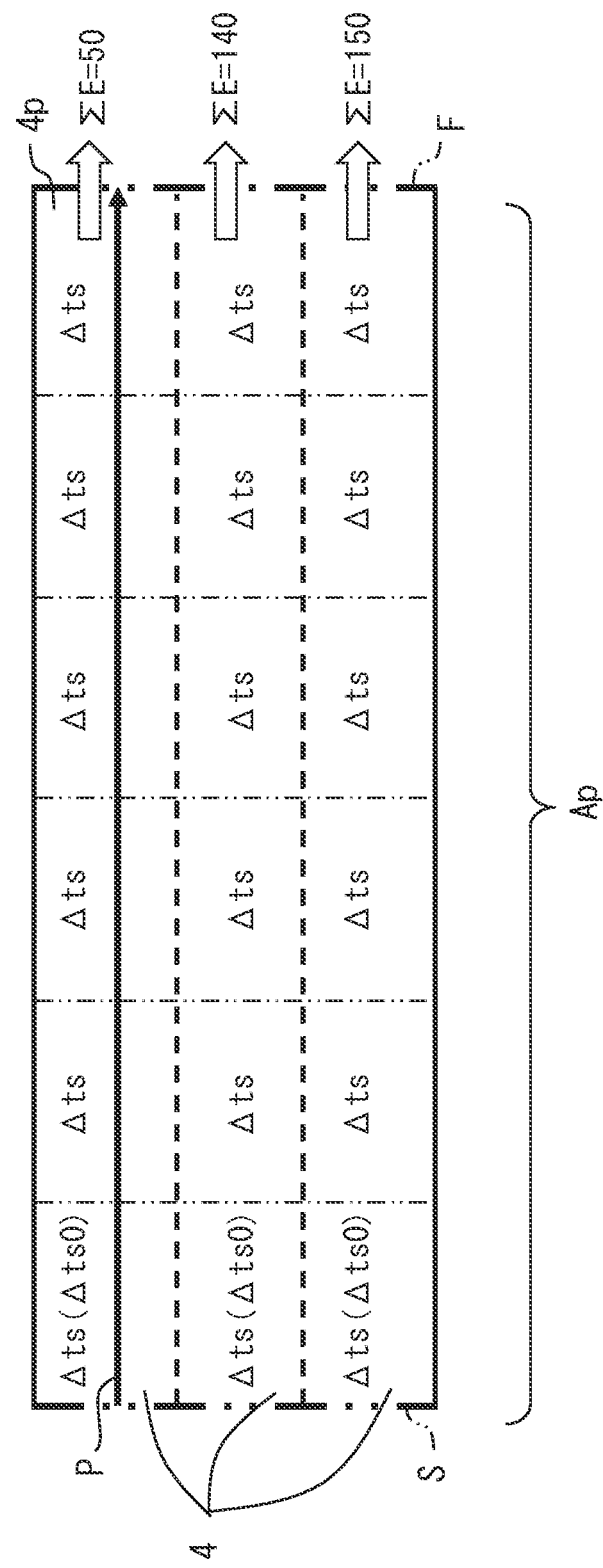
FIG. 13 is a schematic diagram for explaining a selection process for the traveling lane according to the embodiment.
Figure 14:
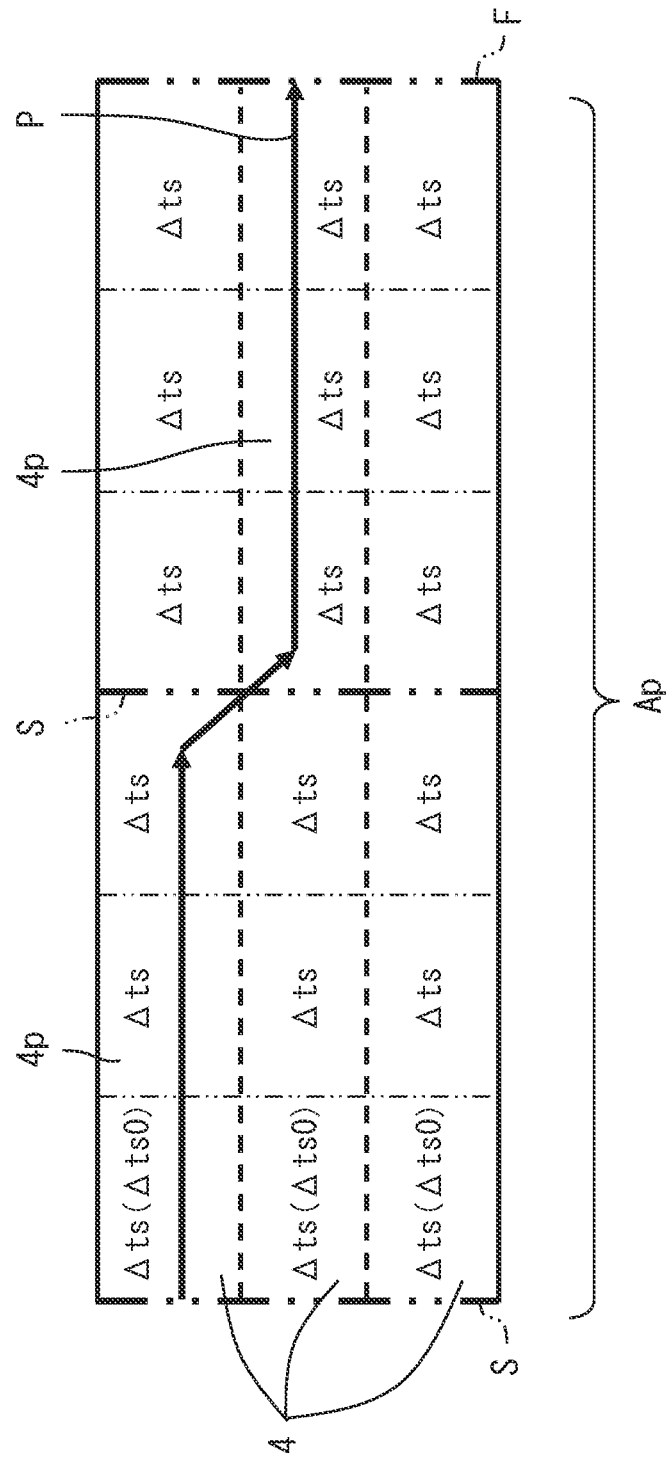
FIG. 14 is a schematic diagram for explaining an example of a planned traveling path according to the embodiment.

The lane selection block 140 shown in FIG. 2 is configured to select, based on the evaluation accumulated value a acquired by the evaluation score accumulation block 120 for each traveling lane 4, the traveling lane 4p for the traveling path P in the path planning area Ap with parallel traveling lanes 4 as shown in FIG. 13. At this time, the traveling lane 4p whose the evaluation accumulated value a indicates the lowest traveling risk, i.e. the traveling lane 4p with the smallest evaluation accumulated value a in the present embodiment, is selected. As a result of the selection process, the traveling path P, which passes through the traveling lane 4p from the planning start position S to the planning end position F in the path planning area Ap on the future route R, is planned. Although the traveling path P is repeatedly updated, the traveling path P shown in FIG. 13 is the traveling path P planned at a specific timing. Accordingly, at a later update timing than the update timing in FIG. 13, another traveling lane 4p different from the traveling lane 4p shown in FIG. 13 may be reselected as shown in FIG. 14 in response to, for example, the resolution of the traffic jam or the regulated situation, or a change in the optimal traveling lane 4b.

The traveling path P passing through the selected traveling lane 4p is input from the lane selection block 140 to the trajectory control device 2. The trajectory control device 2 executes the trajectory control within the traveling path P. The trajectory control device 2 is configured to generate optimal trajectory within the traveling path P, and control the steering of the subject vehicle 3 according to the generated trajectory. The control process is performed based on the information from the sensor system 5.

The flow of the path planning method for the path planning device 1 to plan the traveling path P in corporation with the lane evaluation block 100, the evaluation score accumulation block 120, and the lane selection block 140 will be described with reference to FIGS. 15, 16. This flow is started at each update timing of the traveling path P. Here, the update timing may be a timing at regular time intervals, or a timing when the subject vehicle 3 arrives at the end of the first chronological section Δts0 of the previous flow. Further, in this flow, "S" means steps of the process executed by instructions included in the path planning program.

Figure 15:
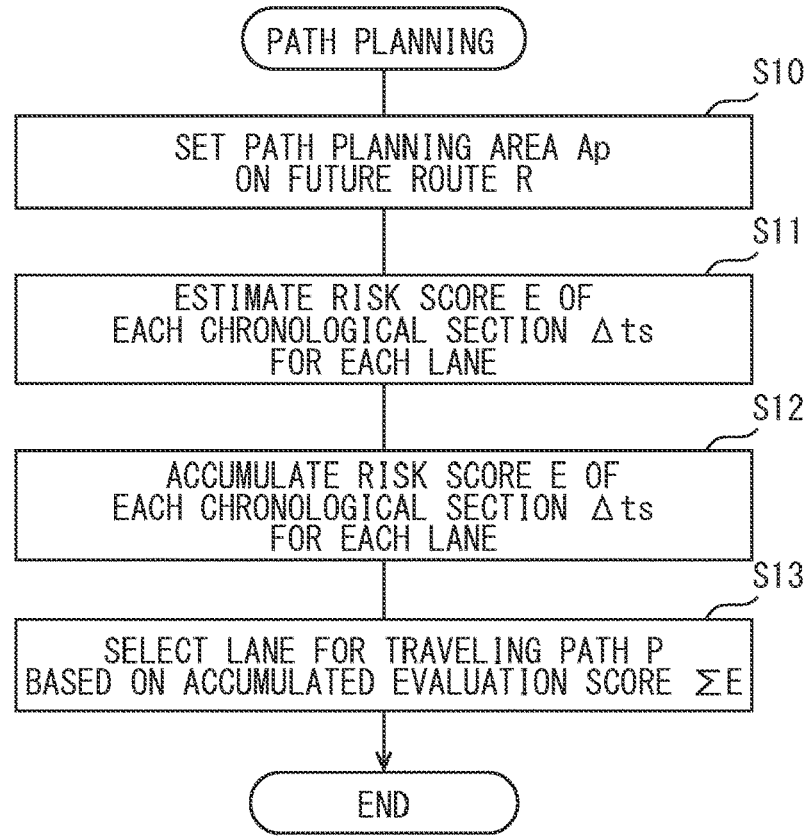
FIG. 15 is a flowchart showing a flow of a path planning method according to the embodiment.

In S10 shown in FIG. 15, the lane evaluation block 100 sets the number of the path planning areas Ap on the future route R according to the number of the change nodes N on the future route R. In S11, the lane evaluation block 100 estimates the risk score E of each traveling lane 4 for each chronological section Δts in the set path planning area Ap with the parallel traveling lanes 4.

Figure 16:
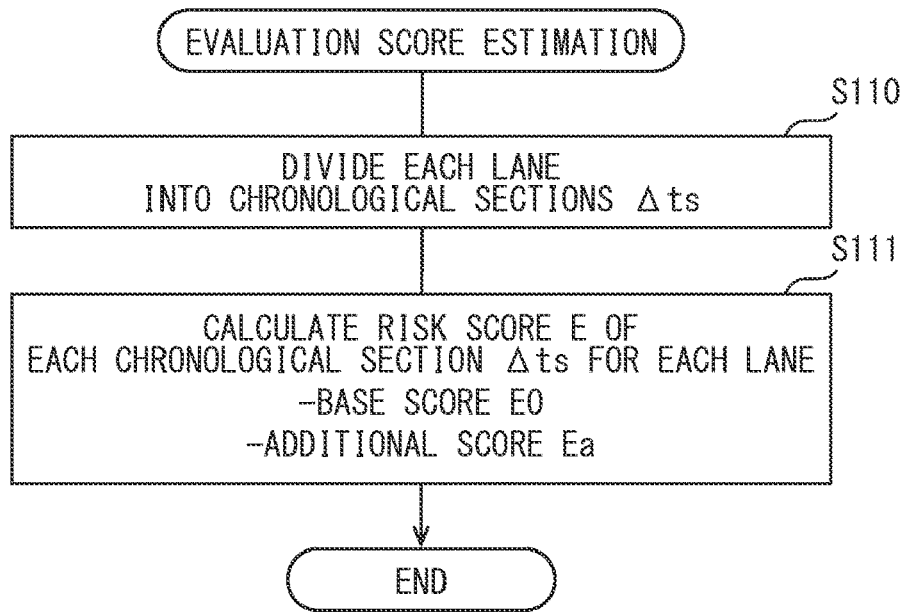
FIG. 16 is a flowchart showing a flow of the path planning method according to the embodiment.

Specifically, in S110 of S11 in FIG. 16, the lane evaluation block 100 divides each traveling lane 4 in the path planning area Ap that is the evaluation target into chronological sections Δts. In S111 of S11, the lane evaluation block 100 calculates the risk score E of each chronological section Δts for each traveling lane 4. In S111, the base score E0 is estimated based on the static information Is as the risk score E of the first chronological section Δts for each traveling lane 4. The static information Is used for estimating the base score E0 contains the number of lane changes C and the traveling difficulty level D at the change node N. In S111, the additional score Ea is estimated, based on the static information Is and the dynamic information Id, as the risk score E of each chronological section Δts for each traveling lane 4. The static information Is used for estimating the additional score Ea contains the lane width W. The dynamic information Id used for estimating the additional score Ea contains the traffic congestion information T and the regulation information L.

As shown in FIG. 15, in S12 subsequent to S11, the evaluation score accumulation block 120 accumulates, for each traveling lane 4, the risk scores E estimated for each chronological section Δts in the path planning area Ap that is the evaluation target. In S12, the risk scores E are accumulated by adding the additional scores Ea calculated in S111 for each chronological section Δts to the base score E0 calculated in S111. As a result, the evaluation accumulated value a is acquired in S12.

In S13, the lane selection block 140 selects the traveling lane 4p for the traveling path P based on the evaluation accumulated values a acquired for each traveling lane 4. As a result, in S13, the traveling path P, which passes through the traveling lane 4p from the planning start position S to the planning end position F in the path planning area Ap that is the evaluation target, is planned. Then, the current execution of the flow ends.

In the present embodiment, the lane evaluation block 100 corresponds to a lane evaluation unit, the evaluation score accumulation block 120 corresponds to a score accumulation unit, and the lane selection block 140 corresponds to a lane selection unit. Further, in the present embodiment, S10, S11 correspond to a lane evaluation process, S12 corresponds to a score accumulation process, and S13 corresponds to a lane selection process.

(Operation Effects)

The functions and effects in the present embodiment described above will be explained below.

According to the present embodiment, the risk score E, which is estimated for each chronological section Δts on the future route R and is used for evaluating the traveling risk of each traveling lane 4, is accumulated for each traveling lane 4. According to this, since the traveling lane 4p for the traveling path P is selected based on the evaluation accumulated value a of each traveling lane 4 which reflects the traveling risk in each chronological section Δts having a different position and a different time, the erroneous selection of the traveling lane 4p is likely to occur. Accordingly, the erroneous plan of the traveling path P can be suppressed.

Since the base score E0 of the traveling lane 4 which is the risk score E of the first chronological section Δts on the future route R is based on the static information Is that is fixed in time, the traveling risk of each traveling lane 4 can be appropriately estimated. Accordingly, the selection accuracy in the selection of the traveling lane 4p is improved, and the erroneous plan of the traveling path P can be suppressed.

According to the static information Is of the present embodiment, the base score E0 of the risk score E can be appropriately estimated to be higher as the number of lane changes C required for the subject vehicle 3 to travel from the planning start position S to the optimal traveling lane 4p at the planning end position F on the future route R is larger. Accordingly, the selection accuracy in the selection of the traveling lane 4p is improved, and the erroneous plan of the traveling path P can be suppressed.

According to the static information Is of the present embodiment, the base score E0 of the risk score E can be appropriately estimated to be higher as the traveling difficulty level D of the traveling lane 4 for the subject vehicle 3 at the change node N at which the lane arrangement of the traveling lanes 4 on the future route R changes is higher. Accordingly, the selection accuracy in the selection of the traveling lane 4p is improved, and the erroneous plan of the traveling path P can be suppressed.

Since the risk score E of the present embodiment is estimated based on the static information Is that is fixed in time, the risk score E can be appropriately estimated with respect to the location of the chronological section Δts. Accordingly, the selection accuracy in the selection of the traveling lane 4p is improved, and the erroneous plan of the traveling path P can be suppressed.

According to the static information Is of the present embodiment, the risk score E can be appropriately estimated such that the traveling risk is higher as the lane width W of the traveling lane 4 is narrower. Accordingly, the selection accuracy in the selection of the traveling lane 4p is improved, and the erroneous plan of the traveling path P can be suppressed.

Since the risk score E of the present embodiment is estimated based on the dynamic information Id that changes in time, the risk score E can be appropriately estimated with respect to the time of the chronological section Δts. Accordingly, the selection accuracy in the selection of the traveling lane 4p is improved, and the erroneous plan of the traveling path P can be suppressed.

According to the present embodiment, the traffic congestion information T that indicates the situation of the traffic congestion of the other vehicles 6 and the regulation information L that indicates the traveling regulation situation of the subject vehicle 3 are used as the dynamic information Id of each chronological section Δts for estimating the risk score E. According to this, the estimation of the risk score E can be improved by using the traffic congestion information T and the regulation information L which influence the traveling risk. Accordingly, the selection accuracy in the selection of the traveling lane 4p is improved, and the erroneous plan of the traveling path P can be suppressed.

Other Embodiments

Although one embodiment has been described, the present disclosure should not be limited to the above embodiment and may be applied to various other embodiments within the scope of the present disclosure.

The dedicated computer of the path planning device 1 in a modification example may be at least one outside center computer communicating with the subject vehicle 3. In this case, a traveling path P may be planned by the outside center computer of the trajectory generation device 1 and instructed to the subject vehicle 3.

The dedicated computer of the path planning device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In S111 performed by the lane evaluation block 100 of a modification example, the evaluation target may be fixed to the path planning area Ap whose planning start position S is at the change node N. In S111 performed by the lane evaluation block 100 of a modification example, the evaluation target may be fixed to the path planning area Ap whose planning start position S is at the current position of the subject vehicle 3.

In S111 performed by the lane evaluation block 100 of a modification example, the estimation of the base score E0 may be omitted, and only the additional scores Ea may be accumulated in S12 performed by the evaluation score accumulation block 120. In S111 performed by the lane evaluation block 100 of a modification example, the base score E0 may be estimated based on the dynamic information Id in addition to or instead of the static information Is. In S111 performed by the lane evaluation block 100 of a modification example, the static information Is used for estimating the base score E0 may not contain one of the number of lane changes C and the traveling difficulty level D. In S111 performed by the lane evaluation block 100 of a modification example, the static information Is used for estimating the base score E0 may contain information different from the number of lane changes C and the traveling difficulty level D.

In S111 performed by the lane evaluation block 100 of a modification example, the static information Is used for estimating the Additional score Ea may not contain the lane width W. In S111 performed by the lane evaluation block 100 of a modification example, the static information Is used for estimating the Additional score Ea may contain information different from the lane width W. In S111 performed by the lane evaluation block 100 of a modification example, the static information Is may not be used for estimating the additional score Ea. In S111 performed by the lane evaluation block 100 of a modification example, the dynamic information Id used for estimating the Additional score Ea may not contain one of the traffic congestion information T and the regulation information L. In S111 performed by the lane evaluation block 100 of a modification example, the dynamic information Id used for estimating the Additional score Ea may contain information different from the traffic congestion information T and the regulation information L. In S111 performed by the lane evaluation block 100 of a modification example, the dynamic information Id may not be used for estimating the additional score Ea.

What is claimed is:

1. A path planning device configured to plan a traveling path on a future route of a vehicle, the path planning device comprising:
   a lane evaluation unit configured to estimate a risk score of each chronological section of each traveling lane on the future route including parallel traveling lanes, the risk score representing a traveling risk;
   a score accumulation unit configured to accumulate the risk scores of chronological sections for each traveling lane; and
   a lane selection unit configured to select the traveling lane for the traveling path based on evaluation accumulated values each of which is calculated by accumulating the risk scores for each traveling lane, wherein
   the lane evaluation unit is configured to estimate, as the risk score of a first one of the chronological sections in each traveling lane, a base score based on static information that is fixed in time,
   the static information contains a traveling difficulty for the vehicle at a change node at which a lane arrangement changes on the future route, and
   the lane evaluation unit is configured to estimate the base score such that the traveling risk is higher as the traveling difficulty is higher.

2. The path planning device according to claim 1, wherein the static information contains a number of lane changes required for arriving at the traveling lane which is optimal at a planning end position on the future route from a planning start position of each traveling lane, and
   the lane evaluation unit is configured to estimate the base score such that the traveling risk is higher as the number of lane changes is larger.

3. The path planning device according to claim 1, wherein the lane evaluation unit is configured to estimate the risk score of each of the chronological sections based on static information that is fixed in time.

4. The path planning device according to claim 3, wherein the static information contains a lane width of each traveling lane, and
   the lane evaluation unit is configured to estimate the risk score such that the traveling risk is higher as the lane width is narrower.

5. The path planning device according to claim 1, wherein the lane evaluation is configured to estimate the risk score of each of the chronological sections based on dynamic information that changes in time.

6. The path planning device according to claim 5, wherein the dynamic information contains at least one of
   traffic congestion information indicating a traffic congestion situation in each of the chronological sections, and
   regulation information indicating an occurrence situation of regulations which limit traveling of the vehicle in each of the chronological sections.

7. A method for a processor to plan a traveling path on a future route of a vehicle, the method comprising:
   estimating a risk score of each chronological section of each traveling lane on the future route including parallel traveling lanes, the risk score representing a traveling risk;
   accumulating the risk scores of chronological sections for each traveling lane; and
   selecting the traveling lane for the traveling path based on evaluation accumulated values each of which is calculated by accumulating the risk scores for each traveling lane, wherein
   in the estimating the risk score, a base score is estimated based on static information that is fixed in time as the risk score of a first one of the chronological sections in each traveling lane,
   the static information contains a traveling difficulty for the vehicle at a change node at which a lane arrangement changes on the future route, and
   in the estimating the risk score, the risk score is estimated such that the traveling risk is higher as the traveling difficulty is higher.

8. The method according to claim 7, wherein
   the static information contains a number of lane changes required for arriving at the traveling lane which is optimal at a planning end position on the future route from a planning start position of each traveling lane, and
   in the estimating the risk score, the risk score is estimated such that the traveling risk is higher as the number of lane changes is larger.

9. The method according to claim 7, wherein
   in the estimating the risk score, the risk score of each of the chronological sections is estimated based on static information that is fixed in time.

10. The method according to claim 9, wherein
the static information contains a lane width of each traveling lane, and
in the estimating the risk score, the risk score is estimated such that the traveling risk is higher as the lane width is narrower.

11. The method according to claim 7, wherein
in the estimating the risk score, the risk score of each of the chronological sections is estimated based on dynamic information that changes in time.

12. The method according to claim 11, wherein
the dynamic information contains at least one of
traffic congestion information indicating a traffic congestion situation in each of the chronological sections, and
regulation information indicating an occurrence situation of regulations which limit traveling of the vehicle in each of the chronological sections.

* * * * *